United States Patent [19]

Castellon

[11] Patent Number: 5,785,600
[45] Date of Patent: Jul. 28, 1998

[54] CARDAN JOINT FOR STEERING COLUMN MADE OF DIFFERENT CROSS-SECTIONAL SHAPED ELEMENTS

[76] Inventor: Melchor Daumal Castellon, Diputacion, 455, 08013 Barcelona, Spain

[21] Appl. No.: 665,356

[22] Filed: Jun. 17, 1996

[30] Foreign Application Priority Data

Jun. 16, 1995 [ES] Spain .................. 9501211

[51] Int. Cl.⁶ ........................................ F16D 3/52
[52] U.S. Cl. .............................. 464/89; 403/282
[58] Field of Search ................. 464/87, 89; 29/516, 29/517; 403/282, 281, 279, 274; 74/492, 493

[56] References Cited

U.S. PATENT DOCUMENTS

| | | | |
|---|---|---|---|
| 3,822,464 | 7/1974 | Hester et al. .................... | 29/516 X |
| 4,211,589 | 7/1980 | Fisher et al. .................... | 403/282 X |
| 4,330,924 | 5/1982 | Kushner et .................... | 29/516 X |
| 4,426,761 | 1/1984 | Sassak .................... | 29/516 X |
| 4,572,022 | 2/1986 | Mettler .................... | 29/517 X |
| 4,667,530 | 5/1987 | Mettler et al. .................... | 464/89 X |
| 5,086,661 | 2/1992 | Hancock .................... | 464/89 X |
| 5,309,620 | 5/1994 | Shinohara et al. .................... | 403/282 X |
| 5,348,345 | 9/1994 | Dykema et al. .................... | 464/89 X |

FOREIGN PATENT DOCUMENTS

| | | | |
|---|---|---|---|
| 331412 | 9/1989 | European Pat. Off. ........ | 403/282 |
| 0392858 | 10/1990 | European Pat. Off. . | |
| 2847541 | 5/1980 | Germany .................... | 464/89 |
| 1369228 | 10/1974 | United Kingdom . | |
| 2057632 | 4/1981 | United Kingdom . | |
| 2070737 | 9/1981 | United Kingdom .................... | 464/89 |

*Primary Examiner*—Donald P. Walsh
*Assistant Examiner*—William A. Rivera
*Attorney, Agent, or Firm*—Jacobson, Price, Holman & Stern, PLLC

[57] ABSTRACT

A Cardan joint is designed to eliminate the bolt normally used between male and female interfitted tubular elements for preventing axial motion and for coupling the parts so as to facilitate assembly of the shaft under any conditions, i.e. both in the factory and when the shaft is repaired. For preventing axial motion and holding the elements together, the outer surface of the male part and the inner surface of the female part have distorted cross-sectional portions. The male part has projections at one end which have a peripherally indented configuration similar to the female part.

3 Claims, 1 Drawing Sheet

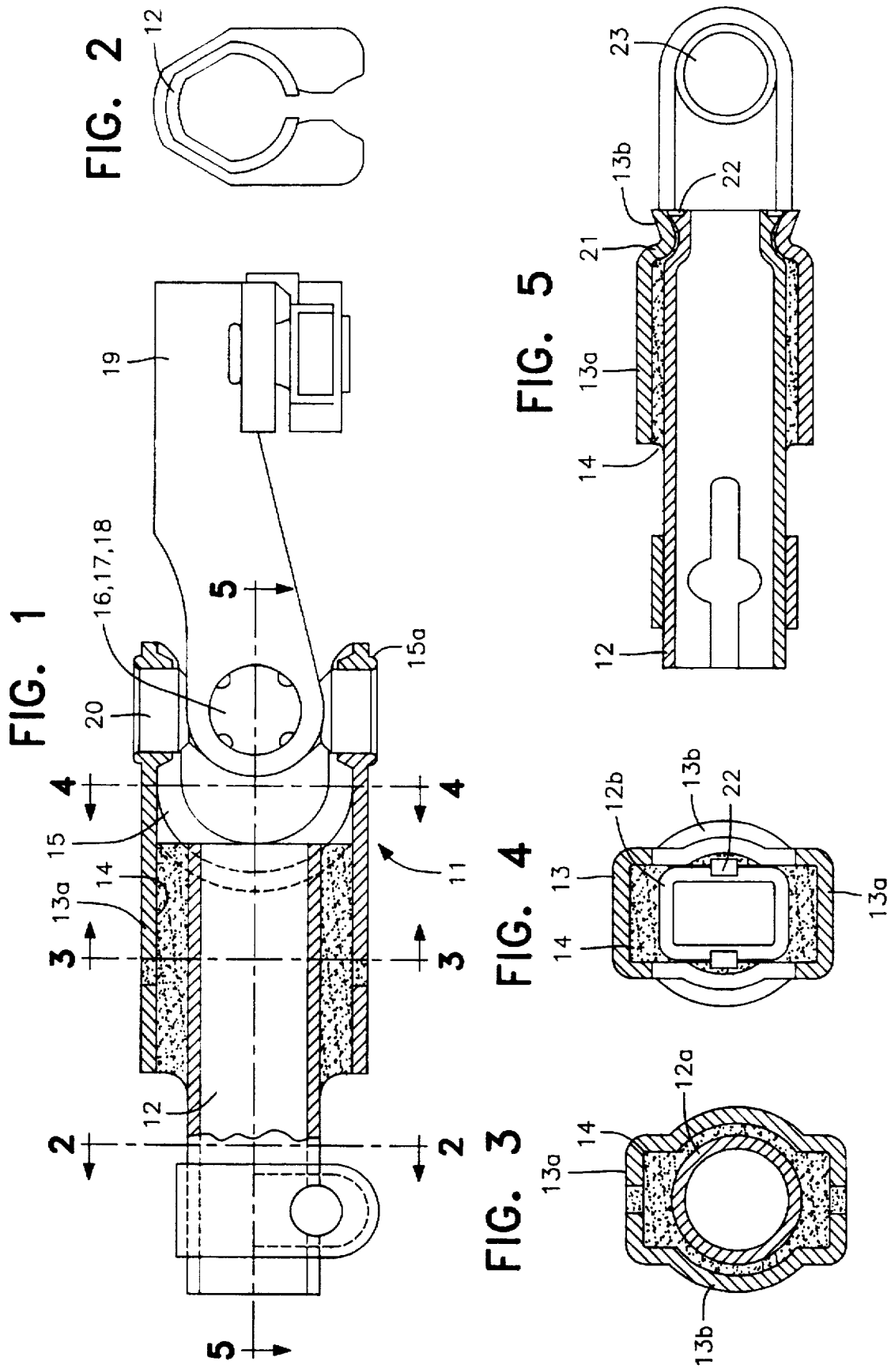

5,785,600

CARDAN JOINT FOR STEERING COLUMN MADE OF DIFFERENT CROSS-SECTIONAL SHAPED ELEMENTS

BACKGROUND OF THE INVENTION

The present invention relates to a Cardan joint particularly for steering columns having a novel constructional shape and design features that fulfill the purpose for which it has been specifically designed, with maximum safety and efficiency.

The invention is in the mechanical sector, more particularly in the motor vehicle sector, with special application to steering columns where motion cannot be transmitted via a longitudinal shaft in one piece, but as a result of the mechanical characteristics of modern motor vehicles, where maximum space is provided for the occupants, it is necessary among other objects that transmission of motion, for steering and the like, must change direction at a location which is usually disposed in the front part of the vehicle. A Cardan joint is commonly used in steering columns for this purpose but can also be applied to other situations whenever the transmitted motion must follow various directions until it arrives at the desired point, starting from a point at the other end of the shaft as required by the user.

Known technical solutions, with aforementioned objects regarding safety and space, start from the steering shaft, in that one end of the shaft, hereafter referred to as the male part, is inserted into the interior of the other end of the shaft, or female part, optionally with interposed anti-vibration means such as resilient joints or the like, preventing relative motion between the two parts, via a bolt which secures the two parts which are provided with holes for inserting the bolt.

The bolt also compensates for torsional force between the ends of the divided shaft, and prevents axial motion between the aforementioned ends, being optionally actuatable in dependence on its greater or lesser resistance, as a safety element in the event of a collision.

Another technical aspect which has also to be taken into account is the ease of assembly and dismantling of the divided steering shaft, which cannot adversely affect the reliability and safety, since the Cardan joint, before suffering a collapse, is capable of withstanding axial forces without some components disengaging from the others, i.e. the inner male part disengaging from the female part which surrounds it, the most frequent solution nowadays.

Other objects must also be fulfilled, e.g. the transmission shaft with its Cardan joint should not convey or amplify, acting as a conducting support of, vibrations generated by components or devices disposed at one end of the shaft and transfer them to the user of the vehicle, and consequently transmission shafts should incorporate anti-vibration elements capable of absorbing a number of vibrations and movements which affect the shaft, thus avoiding noise, vibration and shaking of the user, and also other components with which the shaft is in contact, resulting in a manifold annoyance to occupants in the vehicle passenger compartment.

SUMMARY OF THE INVENTION

The novel Cardan joint according to the invention provides for the elimination of the bolt and provides the male and female parts with means for preventing axial motion and means for coupling the parts so as to facilitate assembly of the shaft under any conditions, i.e. both at the factory and when the shaft is repaired.

The means provided for preventing axial motion may comprise a spatial design of the outer surface of the male part and of the inner surface of the female part, the former being provided with projections at one end, with an appreciably warped configuration substantially similar to the female part, so that the male part can be force-fitted into the interior of the female part and cannot come out unless the force reaches a level which is abnormal under usual operating conditions. All the above is supplemented by action of the previously-mentioned projections, formed by flanges which are doubled towards the interior, preventing the male part from projecting in front of the interior of the female part.

The coupling means are obtained via a change in the crosssection of the male part corresponding to a change in the section of the female part which facilitates insertion of the former into the interior of the latter in a single correct position.

Other details and features of the invention will be clear from the following description with reference to the accompanying drawings, which diagrammatically show preferred details. The details are given by way of example with reference to a possible embodiment, but are not limited to the details set out. Accordingly, the description should be considered as an illustration and without limitation of any kind.

BRIEF DESCRIPTION OF THE DRAWINGS

FIG. 1 is a longitudinal section in elevation of a Cardan joint according to the invention;

FIG. 2 is a sectional view on line 2—2 in FIG. 1;

FIG. 3 is a sectional view on line 3—3 in FIG. 1;

FIG. 4 is a sectional view on line 4—4 in FIG. 1; and

FIG. 5 is a longitudinal section view on line 5—5 in FIG. 1.

DETAILED DESCRIPTION OF THE PREFERRED EMBODIMENTS

The various components in the accompanying drawings are as follows: Cardan joint 11, tubular element 12, cylindrical part 12a, rectangular section 12b, yoke body 13, flat bases 13a, curved sides 13b, shock-absorber 14, incorporated yoke 15, wings 15a of the yoke 15, universal joint 16, resilient joint 17, bearings 18, yoke 19, bearing housing 20, curved zone 21, projections 22.

As shown in FIG. 1, a preferred Cardan joint 11 is formed by a tubular element 12 or male part which is inserted into the interior of a body 13 or female part of a yoke 15, which via corresponding components such as the universal joint, resilient joint and bearings 16, 17 and 18, not shown in the drawing and known per se, is articulated to 15 and transmits motion to the yoke 19. One end of the tubular element 12 acts as a male part inserted into the interior of the body 13, which acts as a female part, with anti-vibration means such as a vibration absorber 14 being situated between the two parts. Element 12 can be inserted into the interior of body 13 in only one position as indicated in FIGS. 3 and 4, owing to the special shape of the surfaces of parts 12 and 13.

Rotary motion received by the tubular element 12 is transmitted via the shock-absorber 14 to the yoke 15 and thence to the yoke 19, so that the direction of motion can be adapted to various situations, it being specified that the motion does not follow a straight line but an irregular line or angle as is conventional in divided steering shafts.

To prevent undesired vibration in the transmission shaft, a shock-absorber 14 of known material such as injected rubber, is disposed between the body of the yoke 13 and the tubular element 12.

To facilitate assembly of the element 12 in the interior of body 13 in a single position, and to avoid relative displacement when the two components are rotated, according to the invention the shape of parts 12 and 13, in cross-section, varies longitudinally as shown in FIGS. 3 and 4.

As shown in FIG. 3, in the aforementioned cross-section the body 13 has upper and lower flat faces 13a whereas the sides have a substantially circumferential curvature 13b, the shock absorber 14 being inserted between the cylindrical part 12a of the tubular element 12 and the faces 13a and sides 13b. Apertures in body 13 at section 3 may be provided to form keys for the material 14.

In FIG. 4, which is a section on line 4—4 in FIG. 1, it is seen that this point of the body 13a of the yoke 15 has the same shape as at section 3—3 whereas the tubular element 12 in the interior of body 13 has a rectangular cross-section 12b secured at its ends by projections 22 at the end of the intermediate piece 12 and permitting relative motion of body 13 on material 14 under normal conditions and avoiding undesired relative motion of the two components. Accordingly at the ends of body 13 and material 14 there is a constriction or curve or curved zone 21 which serves as a mechanical catch between he body 13 and part 12 when necessary, without vibration from part 12 reaching yoke 19 since the absorber 14 is provided between parts 13 and 12.

The changes in cross-section of parts 12 and 13 in the direction of the longitudinal axis as shown in FIGS. 4 and 5 are designed so that, starting from a given axial force, a mechanical lock is provided between parts 12 and 13 and, under these special conditions, reliable transmission of rotation is guaranteed. A specially important case is when, owing to damage of material 14, a discontinuity could occur in the material and part 12 could rotate relative to body 13.

The special shape of the curved zone 21 in co-operation with the projections 22 in the form of flanges which are doubled in the front of one end of the element at 90° ensures axial retention both towards the exterior (dismantling) or part 12 with respect to body 13 and towards the interior (collapse), the energy in this case being absorbed with additional effect.

The joint as described provides a simple and effective construction which can be applied with ease.

Since the invention has been described in conjunction with the accompanying drawings, it will be understood that any modifications in detail which are considered appropriate may be introduced into the same, within the scope of the following claims.

I claim:

1. A CARDAN JOINT comprising a longitudinal tubular male element having one end received within one end of a longitudinal tubular female element in a coextensive region, the female element having an opposite end formed as a yoke with circular recesses for coupling to a universal joint, a sleeve of shock absorbing material interposed between the tubular elements to reduce vibration, the male and female elements each having different cross-sectionally distorted portions throughout the coextensive region for coupling of said one end of the male element in the female element in only a single position and for compensating for axial forces, each of said male tubular element and said female tubular element include peripheral indentations adjacent the yoke, and said male tubular element includes outwardly bent projections in the form of flanges together with said peripheral indentations providing a mechanical catch for rotation of said male tubular element together with said female tubular element and for ensuring axial retention of said male tubular element and said female tubular element against both forces of extraction of said male tubular element from said female tubular element and collapse of said male tubular element through said female tubular element.

2. A CARDAN JOINT according to claim 1, wherein the male tubular element has a circular cross-section in a first zone which changes in a second zone, located closer to said yoke than the first zone, into a substantially rectangular cross-section with rounded corners.

3. A CARDAN JOINT according to claim 1, wherein the female tubular element has a first cross-sectional zone formed by opposed top and bottom faces and substantially circular sides and a second zone nearer the yoke than the first zone where the sides are circular and of smaller radius than a radius of the sides in the first zone.

* * * * *